United States Patent
Jeromin et al.

(10) Patent No.: US 11,693,420 B2
(45) Date of Patent: Jul. 4, 2023

(54) VEHICLE GUIDANCE VIA INFRARED PROJECTION

(71) Applicant: Universal City Studios LLC, Universal City, CA (US)

(72) Inventors: Aaron Chandler Jeromin, Orlando, FL (US); Akiva Meir Krauthamer, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/986,107

(22) Filed: Aug. 5, 2020

(65) Prior Publication Data

US 2021/0041885 A1 Feb. 11, 2021

Related U.S. Application Data

(60) Provisional application No. 62/884,943, filed on Aug. 9, 2019.

(51) Int. Cl.
*G05D 1/02* (2020.01)
*G05D 1/00* (2006.01)

(52) U.S. Cl.
CPC ......... *G05D 1/0242* (2013.01); *G05D 1/0094* (2013.01); *G05D 1/0223* (2013.01); *G05D 1/0293* (2013.01); *G05D 2201/0212* (2013.01)

(58) Field of Classification Search
CPC .. G05D 1/0242; G05D 1/0094; G05D 1/0223; G05D 1/0293; G05D 2201/0212
See application file for complete search history.

(56) References Cited

U.S. PATENT DOCUMENTS

| | | |
|---|---|---|
| 3,935,922 A | 2/1976 | Cooper et al. |
| 4,361,202 A | 11/1982 | Minovitch |
| 5,111,401 A | 5/1992 | Everett, Jr. et al. |
| 5,203,923 A | 4/1993 | Hailman |
| 5,213,711 A | 5/1993 | Fast |
| 5,415,553 A | 5/1995 | Szmidia |
| 5,622,236 A | 4/1997 | Azumi |
| 5,816,886 A | 10/1998 | Cusolito |

(Continued)

FOREIGN PATENT DOCUMENTS

| | | |
|---|---|---|
| JP | S6172309 A | 4/1986 |
| JP | H0256610 A | 2/1990 |

(Continued)

OTHER PUBLICATIONS

Machine Translation of JP2013167136A (Year: 2013).*

(Continued)

*Primary Examiner* — Rachid Bendidi
*Assistant Examiner* — Sahar Motazedi
(74) *Attorney, Agent, or Firm* — Fletcher Yoder P.C.

(57) ABSTRACT

A system for guiding a vehicle is provided. The system includes multiple paths on a surface, wherein each path is defined by light projection characteristics of a respective light projection defining a respective path. The system also includes the vehicle. The vehicle includes a sensor configured to detect the light projection characteristic of the respective path of the multiple paths, and a controller guide the vehicle along the respective path with a light projection characteristic that matches an expected light projection characteristic that is assigned to the vehicle.

20 Claims, 3 Drawing Sheets

(56) References Cited

U.S. PATENT DOCUMENTS

| | | | |
|---|---|---|---|
| 6,163,745 | A | 12/2000 | Purchase et al. |
| 8,179,337 | B2 | 5/2012 | Wilzbach et al. |
| 8,244,403 | B2 | 8/2012 | Lin et al. |
| 8,245,807 | B2 | 8/2012 | Frank et al. |
| 8,396,597 | B2 | 3/2013 | Anderson |
| 8,616,320 | B2 | 12/2013 | Frank et al. |
| 8,768,559 | B1 | 7/2014 | Murphy |
| 10,191,484 | B2 | 1/2019 | Russell et al. |
| 10,207,193 | B2 | 2/2019 | Stenzler et al. |
| 2002/0198632 | A1 | 12/2002 | Breed et al. |
| 2007/0131597 | A1 | 6/2007 | Chen |
| 2010/0198514 | A1 | 8/2010 | Miralles et al. |
| 2012/0125707 | A1 | 5/2012 | Frank et al. |
| 2014/0129074 | A1 | 5/2014 | Boshears et al. |
| 2015/0294430 | A1 | 10/2015 | Huang et al. |
| 2015/0338226 | A1* | 11/2015 | Mason ............ G08G 1/096838 701/408 |
| 2015/0379704 | A1 | 12/2015 | Chandrasekar et al. |
| 2016/0070262 | A1* | 3/2016 | Kawash ............... G05D 1/0297 701/2 |
| 2016/0089610 | A1* | 3/2016 | Boyle .................... A63G 25/00 463/7 |
| 2017/0021282 | A1* | 1/2017 | Comploi ............. G05D 1/0088 |
| 2017/0236422 | A1 | 8/2017 | Naka et al. |
| 2018/0089901 | A1 | 3/2018 | Rober et al. |
| 2018/0164829 | A1* | 6/2018 | Oshima ................ G05D 1/0248 |
| 2018/0203240 | A1 | 7/2018 | Jones et al. |
| 2018/0216944 | A1 | 8/2018 | Mielenz et al. |
| 2019/0051153 | A1 | 2/2019 | Giurgiu et al. |
| 2019/0107843 | A1 | 4/2019 | Dede |
| 2020/0174484 | A1* | 6/2020 | Eoh ....................... G05D 1/0248 |
| 2021/0170287 | A1* | 6/2021 | Yamich ................. A63G 25/00 |

FOREIGN PATENT DOCUMENTS

| | | | |
|---|---|---|---|
| JP | 2013167136 A | * | 8/2013 |
| WO | 2015179661 A1 | | 11/2015 |
| WO | 2019055281 A2 | | 3/2019 |

OTHER PUBLICATIONS

Machine Translation of JPS6172309A (Year: 1986).*
PCT/US2020/045456 International Search Report and Written Opinion dated Oct. 29, 2020.
International Search Report and Written Opinion for PCT Application No. PCT/US2019/044595 dated Sep. 27, 2019; 12 pgs.
Office Action for U.S. Appl. No. 16/127,862 dated May 2, 2019; 22 pgs.
Notice of Allowance for U.S. Appl. No. 16/127,862 dated Aug. 9, 2019; 10 pgs.

* cited by examiner

VEHICLE GUIDANCE VIA INFRARED PROJECTION

BACKGROUND

The present disclosure relates generally to the field of vehicle guidance. More specifically, embodiments of the present disclosure relate to vehicle guidance based upon utilizing infrared projections.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks contain a variety of rides providing unique experiences to each park guest. The addition of large attractions, such as rides and shows, generally provides an amusement park with additional capacity to handle a larger number of guests. However, the addition of traditional rides without an added layer of intrigue may be insufficient to garner sufficient guest interest to address either guest traffic issues or provide an advantage over competitors. With the increasing sophistication and complexity of modern attractions, and the corresponding increase in expectations among amusement park and/or theme park guests, improved and more creative attractions are needed, including attractions that provide a unique guest experience. Further, in implementing these improved attractions, safety is a top priority. Mechanical safety mechanisms can sometime wear, requiring untimely repairs to the attraction.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a system for guiding a vehicle is provided. The system includes multiple paths on a surface, wherein each path is defined by infrared projection configured to read by infrared cameras affixed to a vehicle. The system also includes the vehicle. The vehicle includes an infrared camera/sensor mounted to its frame at a height sufficient to view the roadway in front of, behind, and/or around the vehicle. The vehicle includes a controller configured to guide the vehicle along the respective path based on features of the infrared projection that are detected by the sensor.

In another embodiment, a system for guiding a vehicle is provided. The system includes multiple paths on a surface, wherein each path of the multiple paths is defined by an infrared projection formed from infrared laser diodes affixed to structures (e.g., ceilings and/or walls of an attraction). In some instances the diodes may be placed quite far from the attraction as needed (since the laser light will remain collimated and reach quite far). The system also includes multiple vehicles. In addition, each vehicle of the multiple vehicles includes an infrared camera/sensor mounted to its frame at a height sufficient to view the roadway in front of, behind, and/or around the vehicle, and a controller configured to guide the vehicle along the respective path of the multiple paths based on characteristics of the infrared projection of respective path of the multiple paths detected by the sensor. For example, different paths may include different infrared patterns, such as dots, dashes, lines, or other identifiable markings onto the travel surface. Each of the multiple vehicles may identify a correct path based upon these identifiable markings of the various paths.

In another embodiment, a method for guiding a vehicle is provided. The method includes obtaining, at a controller of the vehicle, an infrared projection on a travel surface to guide the vehicle along a path, wherein the path is among multiple paths on the travel surface, and each path among the multiple paths is defined by one or more infrared projections that can be observed by infrared cameras affixed to the vehicles. The method further includes detecting, via a sensor on the vehicle, characteristics associated with the one or more infrared projections and guiding, via the controller, the vehicle along the path among the multiple paths based on the characteristics detected by the sensor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement parks feature a wide variety of entertainment, such as amusement park rides, performance shows, and games. Embodiments of the present disclosure are directed to a ride vehicle guidance system that uses infrared projections to perform automated vehicle guidance. While the current discussion will center around amusement park ride guidance, the current systems and techniques could be used in a variety of applications, from robot guidance to roadway or other vehicle guidance. The current discussion is not intended to limit the current vehicle guidance system to amusement ride guidance. A plurality of paths may be disposed on a surface. Each path is defined by infrared projections (e.g., infrared light forming particular path patterns, such as reoccurring or non-reoccurring patterns of particular shapes and/or objects (e.g., bar codes, QR codes, etc.)). In certain embodiments, each path generally includes different projection characteristics than other paths, making each path discernable from one another. Each ride vehicle may be equipped with an infrared camera or sensor configured to detect emitted infrared light making up the infrared projections. Due to the infrared light wavelengths, the infrared light projections may not be visible to the human eye and therefore may not be visible to passengers on the vehicles or the people standing by to ride the vehicles. The paths may intersect. In addition, multiple vehicles may move along the paths at the same time and pass each other. In some embodiments, the passenger may be able to change the path the vehicle is moving along via an input provided to the vehicle. In certain embodiments, the characteristics of the infrared projections may vary along a path at different locations to alter the speed of the vehicle (e.g., accelerate, decelerate, stop, etc.) or cause the vehicle to perform an action (e.g., spin). Due to the invisibility of the paths, the amusement attraction may seem unpredictable to the passenger and enhance the ride experience of the passenger.

Figure 1:
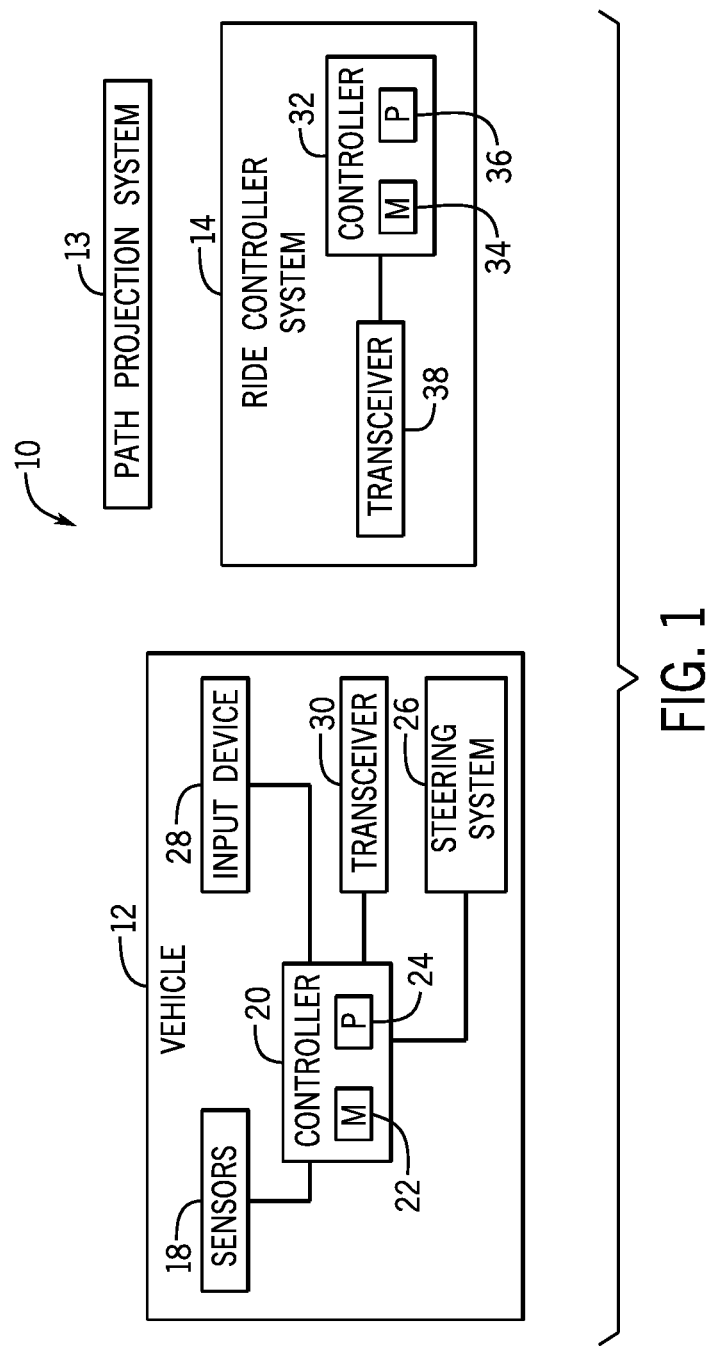
FIG. 1 is a schematic of an embodiment of a ride vehicle guidance system of an amusement attraction that uses infrared projections to automate guidance, in accordance with an aspect of the present disclosure.

Turning to the figures, FIG. 1 illustrates an embodiment of a schematic of an embodiment of a ride vehicle guidance system 10 of an amusement attraction that uses infrared projections to determine guidance of the ride vehicle. As shown in the illustrated embodiment of FIG. 1, the system 10 may include a vehicle 12 (e.g., ride vehicle), a path projection system 13, and a ride controller system 14. In certain embodiments, the system 10 may include a plurality of vehicles 12. The system 10 may be configured to be utilized in conjunction with one or more infrared projections that are projected on a travel surface (from the path projection system 13), where the infrared projections define one or more paths for the vehicle 12 to follow. The paths may be differentiated from one another based upon characteristics of infrared projections. In certain embodiments, each path may be defined by a different infrared projection than those defining the other paths. In certain embodiments, a particular path may include, at different locations along the path, triggering characteristics (e.g., modified projections), that trigger different actions to be performed by the vehicle 12. These different actions may include changing speed (e.g., accelerating, decelerating, stopping, etc.) or other actions, such as spinning in place, activating a show feature, etc. In certain embodiments, a particular path may include a central portion having a first characteristic and one or more flanking portions that have different characteristics. These differing portion may be used to identify how far the vehicle 12 is deviating from the path (e.g., the central portion) and/or that vehicle 12 correct course to get back on the path. In certain embodiments, marks and/or patterns (e.g., dots, dashes, lines, tick marks, bar codes, QR codes, etc.) may be projected in or near or make up the infrared projection to provide certain information (e.g., distance travelled, path information, speed, etc.) to the vehicle 12 and/or ride controller system 14. In certain embodiments, these marks may indicate the validity of the path. For example, when the marks are expected, but not found, this may indicate a rogue projection or a projection that should not be trusted for guidance.

The path projection system 13 may include, in some embodiments, a system of infrared laser diode affixed to the ceiling or walls, either around the track, or optionally placed quite far from the attraction as needed (since the laser light will remain collimated and reach quite far (i.e. drone navigation uses). The infrared laser emitters can be placed off axis to the sides of the track, or directly overhead to minimize potential occlusions that can occur from set, or other line of sight interferences.

These laser diodes may project a linear pattern of dots, dashes, lines, or some other identifiable marking onto the travel surface. These diodes may be infrared (IR) laser pointers, aimed at regular intervals along the track, to indicate the center of the travel path. In another variation, an optical modifier may be included, so that the laser spot is stretched into an infrared line segment. Multiple line segments can then be setup one after another along the travel path.

In another variation, an optical diffusion grating or waveguide may be placed in the light path in order to generate a specific projection pattern on the target surface (i.e. barcodes, multiple dots and dashes, QR codes). Fiber optics could also serve this purpose, and direct a single light source in multiple directions simultaneously, to allow for fewer required light and power sources.

In another variation, a scanning micro-electro-mechanical system (MEMs) or digital micromirror device (DMD) may be used to actively scan out the desired programmable infrared light pattern onto the ground or target surfaces. By projecting a known infrared pattern onto the travel surfaces or environment from one or more off-board fixed locations, the current techniques allow for a fixed patterning of the space, and removes the need for prior knowledge of or extensive processing of the data to derive location information, as in a depth or LIDAR based SLAM navigation system.

The vehicle 12 may include one or more camera/sensors 18 configured to detect the infrared projections. The one or more sensors 18 may be located along the vehicle 12 (e.g., bottom portion and/or front portion of the vehicle 12) at a height sufficient to view the travel surface in front of, behind, and/or around the vehicle 12.

The infrared pixel data from the camera/sensors 18 may be processed locally or remotely (depending on configuration, weight, power and criticality needs), and determine the required adjustments to the vehicle directly, or hand off the data to another computer or PLC for further action (i.e. Estop trigger, warning dispatch, automated course correction).

The vehicle 12 also may include a controller 20 that is configured to control the actions of the vehicle 12. The controller may include a memory 22 and a processor 24 configured to execute instructions stored on the memory 22.

In certain embodiments, the memory 22 may store a set of expected characteristics that should be observed via the sensors 18 in guiding the vehicle 12 along a particular path. In addition, the memory 22 may store additional characteristics that, when observed (or in some cases when not observed), cause various actions of the vehicle (e.g., accelerating, decelerating, stopping, spinning, animating a show effect, etc.). In certain embodiments, the memory 22 may store entire paths and any characteristics or changes in the infrared projections associated with particular paths. The controller 20 may be configured to compare the expected characteristics (e.g., from the memory 22 and/or the ride controller system 14) with the infrared projection detected by the sensors 18 to identify guidance control of the vehicle 12 along a particular path. In certain embodiments, the comparison may cause the controller 20 to correct course back onto the path if the vehicle 12 deviates from the path or otherwise perform other activities.

The controller 20 may control the vehicle 12 via a steering system 26 coupled to wheels on the vehicle 12. The controller also may be coupled to an input device 28 on the vehicle 12. The input device 28 may include a touch screen, one or more buttons, levers, or any other device. The input device 28 may enable the passenger to provide an input that results in selecting and/or changing a path. For example, the input device 28 may provide the passenger different options or scenarios (e.g., passage thru a particular themed section, a difficulty level of the passage, etc.). Various inputs received via the input device 28 may be associated with particular expected/assigned projection characteristics utilized by the controller 20 in guiding the vehicle 12. In certain embodiments, the passenger may be able to provide the input prior to the ride starting, which determines the initial path and/or subsequent path utilized by the vehicle 12. In certain embodiments, the passenger may be able to provide the input during the ride to change the path of the vehicle 12 (e.g., when the vehicle 12 encounters an intersection where the current path crosses other paths). In certain embodiments, when the passenger does not provide input, the controller 20 may automatically determine the path (i.e., the expected/assigned characteristic to utilize) in guiding the vehicle 12.

In certain embodiments, the vehicle 12 may follow one or more paths at the same time, which may induce both translational and rotational motion of the vehicle 12. Indeed, the controller 12 may, in some embodiments, employ sensors 18 that are programmed to track different projected paths. For example, a sensor 18 programmed to track "Path 1" may be located at a front of the vehicle 12 and a sensor 18 programmed to track "Path 2" (e.g., a path having different characteristics than "Path 1") may be located at a back portion of the vehicle 12. The controller 20 may control (e.g., via the steering system 26) wheels of the vehicle 12 located near the front of the vehicle 12 and wheels of the vehicle 12 located near the back of the vehicle 12 to follow projected paths that correspond to the sensor 18 tracking path 1 and the sensor 18 tracking path 2. In this way, the rotation of the vehicle 12 may be encoded into the layout of the projected paths.

These inputs may also cause a dynamic change to characteristics of an infrared projection. For example, if an input indicates a desire to increase the ride speed, characteristics of the infrared projection can be altered to trigger the ride controller system 14 to increase the ride speed. For example, if a current followed infrared projection includes dots, but a dashed projection indicates that the ride controller system 14 should increase speed, the dot projection may be dynamically altered to a dashed projection upon receiving the input, thus indicating to the ride controller system 14 to increase the speed.

In some implementations, a path integrity check system could be added, in order to determine whether the path has been occluded, is broken or shut off, or has changed from the expected configuration. An optional overhead camera set could be added, or the on vehicle camera/sensor 18 itself can scan the path ahead to determine whether the linear path appears as expected, or if it has unexpected breaks in it. Any abnormalities could be reported as a failure or a lower confidence value to the control system.

In a variation that uses projected barcodes or other symbols, the system could determine if any expected symbols are missing, out of order, or out of place/off axis due to drift, bumps, or misalignment. The pattern itself could also allow for this integrity determination. The repeating, or optionally non-repeating pattern could be read and the camera system itself could determine whether the expected pattern of, for instance, dots and dashes has been presented. If not, an error or warning can be thrown or action taken to correct the issue or Estop command issued at that time.

Another modification that can be made to protect the system from unintended infrared light sources interfering is to modulate the laser source in time with the camera frame rate, or modulate its phase so that the sensor filters out unmodulated light sources, such as the sun, or other set lighting.

It may be possible to achieve this with standard theatrical Goes Before Optics (gobo) lighting fixtures as well, instead projecting infrared light patterns through physical masks, focused appropriately on the target surface. Indeed, it should be noted that a gobo lighting fixture (e.g., gobo changer, slide projector type device) may be used to get a basic amount of real time control over the projected patterns. This could lower the cost and complexity potentially, while allowing for standard lighting installation, securing, aiming and mounting procedures to be followed.

The controller 20 also may be coupled to a transceiver 30 configured to communicate wirelessly with other vehicles that may be on the paths and/or the ride controller system 14. In certain embodiments, the vehicle 12 may communicate, via the transceiver 30, its chosen projection characteristics, location, speed, future change in projection characteristics, and/or other information to the other vehicles and/or the ride controller system 14. In certain embodiments, the controller 20 may receive, via the transceiver 30, the same information about other vehicles from the vehicles and/or the ride controller system 14. In certain embodiments, the vehicle 12 may be autonomous from the ride controller system 14. In certain embodiments, control of the vehicle 12 by the controller 20 may be overridden via the ride controller system 14.

The ride controller system 14 may include a controller 32 that controls one or more of the vehicles 12 in the amusement attraction. In certain embodiments, the controller 32 may communicate a particular path (e.g., via a particular one or more projection characteristics) for a particular vehicle 12 to utilize. In certain embodiments, the ride controller system 14 may provide an entire path and any characteristics or changes in characteristics associated with the particular path to the vehicle 12. In certain embodiments, the ride controller system 14 may provide information associated with other vehicles (e.g., expected projection characteristics, location, speed, future change in expected characteristics, and/or other information) to a particular vehicle 12. Actions for the vehicle 12 associated with particular projection characteristics may be already stored on the vehicle 12 and/or provided to the vehicle 12 from the ride controller system 14. The controller 32 may be coupled to a transceiver 38 that enables wireless communication with the vehicles 12.

The processors 24, 36 may each include multiple processors, one or more "general-purpose" microprocessors, one or more special-purpose microprocessors, and/or one or more application specific integrated circuits (ASIC), or some combination thereof. For example, each processor 24 and 36 may include one or more reduced instruction set (RISC) processor, advanced RISC machine (ARM) processor, performance optimization with enhanced RISC (PowerPC) processor, field-programmable gate array (FPGA) integrated circuit, graphics processing unit (GPU), or any other suitable processing device.

Each memory device 22 and 34 may include a volatile memory, such as random access memory (RAM), nonvolatile memory, such as read-only memory (ROM), flash memory, or any combination thereof. Each memory device 22 and 34 may store a variety of information that may be used for various purposes. For example, each memory device 22 and 34 may store processor-executable instructions (e.g., firmware or software) for the respective processors 24 and 36 to execute, such as instructions for controlling the vehicle 12. The storage device(s) (e.g., nonvolatile storage) may include ROM, flash memory, a hard drive, or any other suitable optical, magnetic, or solid-state storage medium, or a combination thereof.

Figure 2:
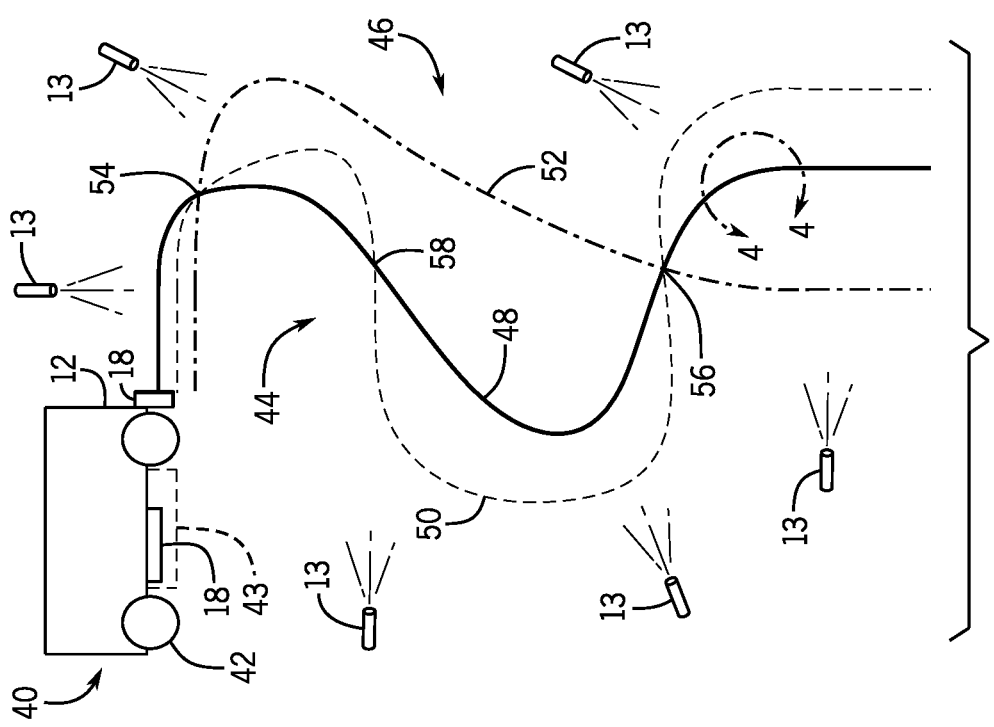
FIG. 2 illustrates an embodiment of an environment of an amusement park utilizing the ride vehicle guidance system of FIG. 1, in accordance with an aspect of the present disclosure.

FIG. 2 illustrates an embodiment 40 of an environment of the amusement park utilizing the ride vehicle guidance system 10 of FIG. 1. The vehicle 12 depicted is as described in FIG. 1. The vehicle 12, which is configured to hold one or more passengers, may include on a bottom portion 43 of the vehicle 12 wheels 42 to enable the vehicle 12 to move along the paths 44 on surface 46. The number of wheels 42 may vary. In certain embodiments, the means for moving the vehicle may vary (e.g., tracks, etc.). The wheels 42 may be coupled to the steering system described above. The vehicle 12 also may include, on the bottom portion 43 (or other portion), the sensor 18 as described above.

As depicted, a plurality of paths 44 may be projected on the surface 46. The paths 44 may include straight and/or curved portions. Three paths 48 (solid line), 50 (dashed line), and 52 (dotted-dashed line) are illustrated. The number of paths 44 may vary. In certain embodiments, the paths 44 or portions of the paths 44 may be associated with a specific theme. In certain embodiments, the paths 44 or portions of the paths 44 may be associated with different thrill levels. For example, less thrilling paths may include a higher number of straighter portions, slower speeds, and/or gradual turns. More thrilling paths may include a higher number of curved portions, faster speeds, sharper turns, and/or spins. The paths 48, 50, 52 all three intersect at points 54 and 56. Paths 48 and 50 also intersect at point 58. Each path 44 may be primarily defined by a different projection characteristics, such as different projected pattern (e.g., dash, dash, dash, vs. dash, dot, dash), different projected shapes (e.g., a first barcode vs. a second barcode or circles vs. squares, etc.), different spacings between shapes, different projection thicknesses, etc. For example, the projection characteristics defining paths 48, 50, and 52 may emit a number of different projection characteristics, respectively. One benefit of utilizing infrared projections to define the paths 44, is that the paths 44 may be easily altered on the surface 46 with little to no facility costs. For example, different infrared sources may be activated to create a completely different set of paths 44 or set of path 44 characteristics that alter control of the vehicle 12. The ride may occur in the dark or in a lighted area.

At intersections 54, 56, and 58, a combination of converging characteristics of the paths 44 may be emitted. The controller of the vehicle 12 may be programmed to recognize these as convergence points and identify characteristics beyond these points to find the assigned path 44 beyond the intersection to keep the vehicle 12 moving along the assigned path. In certain embodiments, at the intersections 54, 56, 58, either as programmed in the controller of the vehicle 12 or based on an input received from the passenger and/or stored expected characteristic changes to the controller of the vehicle 12, the vehicle 12 may change paths. However, in certain embodiments, the illumination of projected paths at the intersections 54, 56, 58 (e.g., path branching points) may be controlled such that the vehicle 12 may not necessarily need to decide which path to take upon arriving at or approaching the intersections 54, 56, 58. In other words, the vehicle 12 and a path projection system 13 may be communicatively coupled to each other such that the projection system 13 illuminates a portion of a path of the vehicle 12 in an immediate vicinity of the vehicle 12 based on the location of the vehicle 12 and deactivates a portion(s) of the path of the vehicle 12 that are away (e.g., relatively far) from an immediate vicinity of the vehicle 12. The path projection system 13 may also deactivate an illumination of other paths based on the location (or other information) of the vehicle 12. For example, a controller (e.g., the controller 20 of FIG. 1) may utilize a location of the vehicle 12 to determine whether the path projection system 13 will illuminate and/or deactivate an illumination of one or more projected paths (or one or more portions of one or more projected paths) at the intersections 54, 56, 58. This may cause the projected path programmed into the vehicle 12 to be the only projected path observed by the sensor 18 at or near the intersections 54, 56, 58. In this way, the control systems (e.g., the controller 20 of FIG. 1) onboard the vehicle 12 may be simplified because the vehicle 12 may not need to pick between multiple paths at the intersections 54, 56, 58. Further, by driving and/or deactivating the illumination of projected paths at the intersections 54, 56, 58, it may be ensured that two vehicles 12 are not in the same zone (e.g., "break zone") as each other.

Additionally, if the vehicle 12 incorporates input indicating preferences for the path or path characteristics from guests in determining a path to proceed upon at the intersections 54, 56, 58, then the input may be transmitted to a ride controller system (e.g., the ride controller system 14 of FIG. 1). In response to the ride controller system receiving the input, the ride controller system may cause the path projection system 13 to project a path based on the input (e.g., the guests' preferences) and rules of the attraction. In other words, the ride controller system may determine which paths should be activated (driven) and/or deactivated based on the guests' preferences and rules related to the attraction.

Figure 3:
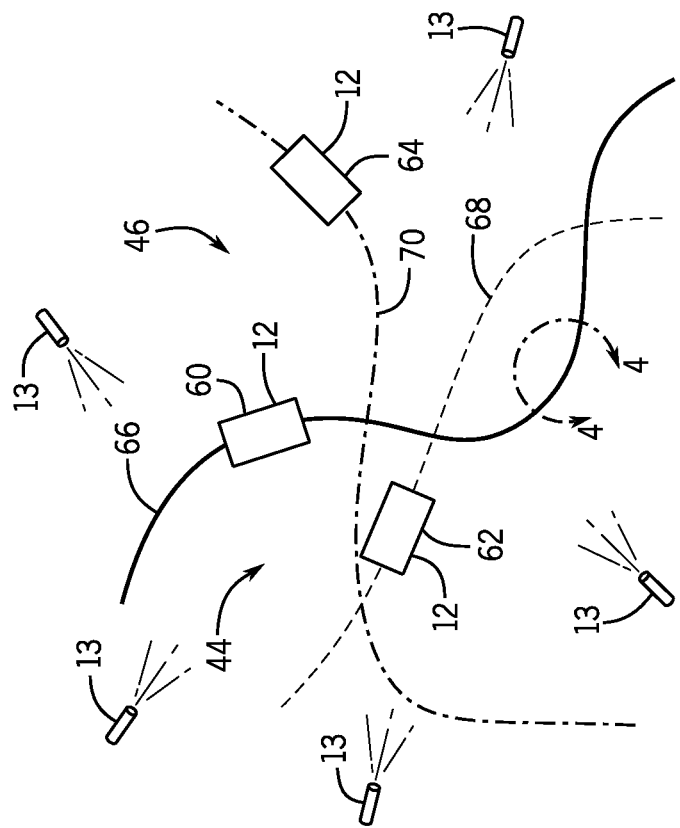
FIG. 3 illustrates an embodiment of an environment of the amusement park utilizing the ride vehicle guidance system of FIG. 1 (e.g., with multiple vehicles), in accordance with an aspect of the present disclosure.

As depicted in FIG. 3, multiple vehicles 12 may be moving along paths 44 on the surface 46 at the same time. The vehicle 12 and paths 44 are as described above. Three vehicles 60, 62, 64 and three paths 66, 68, 70 are illustrated. The number of vehicles 12 and paths 44 may vary. Each vehicle 60, 62, and 64 may move along their respective paths 66, 68, and 70 based on the expected characteristics associated with a respective path. The vehicles 60, 62, and 64 may be in communication with each other and/or the ride controller system. Thus, the vehicles 60, 62, and 64 and/or the ride controller system may be aware of the location of the other vehicles during the ride. In certain embodiments, the vehicles 60, 62, 64 may change paths 44 (as predetermined or in response to passenger input). In certain embodiments, a change in path due to a passenger input may be overridden (e.g., by the passenger's vehicle and/or the ride controller system) due to the location of another vehicle 12. In certain embodiments, certain selections for passenger inputs may not be presented to the passenger due to the location of other vehicles. In certain embodiments, a vehicle 12 may be sped up, slowed down, or stopped in response to the location of other vehicles, lack of expected characteristics in the infrared projection followed by the vehicle 12, or both. In certain embodiments, more than one vehicle 12 may travel on the same path 44.

Figure 4:
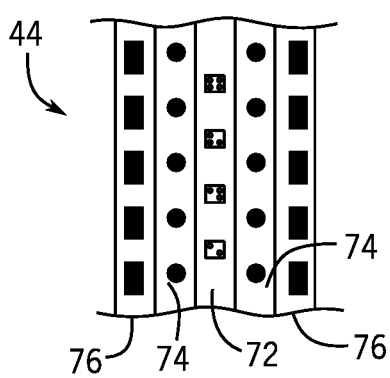
FIG. 4 illustrates an embodiment of a portion of a path having different characteristics, as taken within line 4-4 of FIGS. 2 and 3, in accordance with an aspect of the present disclosure.

FIG. 4 illustrates an embodiment of a portion of the path 44 having different projection characteristics making up the path 44, as taken within line 4-4 of FIGS. 2 and 3. As depicted in FIG. 4, the path 44 may include a central portion 72. The central portion 72, in the current embodiment, includes a first characteristic of a QR code pattern for guiding the vehicle 12 along the path 44. For added security, the expected QR code may be altered along the progression of the central portion 72. This may help ensure that the pattern is not easily copied by unauthorized projections (e.g., from ride users, etc.).

Multiple flanking portions may flank the central portion 72. For example, a first flanking portion 74 may flank the central portion 72 and a second flanking portion 76 may flank both the central portion 72 and the first flanking portion 74. The number of flanking portions may vary. In certain embodiments, the first flanking portion 72 may have both the left and right portions defined by a second characteristic different from the central portion 72, the second flanking portion 76, and any other flanking portion. Here, the first flanking portion 72 includes a repeating circle pattern. The third flanking portion 76 may have both the left and right portions defined by a characteristic different from the central portion 72, the first flanking portion 76, and any other flanking portion. Here, the third flanking portion 76 includes a repeating dashed line pattern.

In certain embodiments, the characteristics of the flanking portions 74, 76 may be associated within an indication of how much (e.g., distance, percentage, etc.) the vehicle 12 has strayed from the central portion 72. In certain embodiments, the characteristics projected by the flanking portions 74, 76 may be associated with instructing the vehicle 12 to correct towards the central portion 72 (e.g., correct left, correct right, etc.). In certain embodiments, the characteristics projected by one or more inner flanking portions may be associated with an indication of how much the vehicle 12 has strayed from the central portion 72, while the characteristics projected by the outermost flanking portion may be associated with instructing the vehicle 12 to correct towards the central portion 72. In certain embodiments, the characteristics projected by the outermost flanking portion may be associated with instructing the vehicle 12 to stop due to deviation from the path 44. In certain embodiments, flanking portions may have different widths. For example, the central portion 72 may be wider in length than the first flanking section 74 and/or the second flanking portion 76. Widened flanking portions may be utilized to reduce false positives in a section of a ride where there is nothing nearby that could be easily hit. Further, employing relatively wide flanking portions may be used in a vehicle that allows guests to have driving control (e.g., steering control) over the vehicle while still keeping the vehicle in a safe zone (e.g., a specific lane) as indicated by the flanking portions of the path.

It should be noted that the path projection systems 13 may project paths onto a ride floor of an attraction. The ride floor may be covered with projected paths 44 in patterns such as a concentric circles of different radii having different projection patterns that correspond to different limitations. The attraction may allow guests to drive freely on the ride floor, but it also may employ certain limitations (e.g., speed limits, time limits, boundary zones, etc.) based on characteristics of a specific concentric circle a vehicle on the ride floor occupies, for example. The different projection patterns may be utilized in determining a location of a vehicle on the ride floor (or other information).

Figure 5:
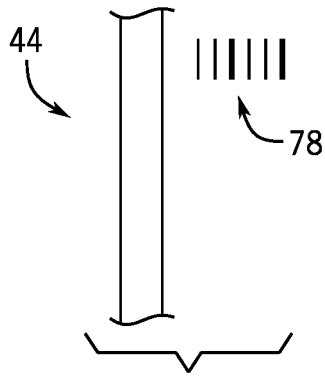
FIG. 5 illustrates an embodiment of a portion of a path having a symbol or marking in the infrared projection, as taken within line 4-4 of FIGS. 2 and 3, in accordance with an aspect of the present disclosure.

FIG. 5 illustrates an embodiment of a portion of the path 44 having a symbol or marking 78 adjacent the path 44, as taken within line 4-4 of FIGS. 2 and 3. As depicted in FIG. 5, symbol or marking may be projected adjacent the path 44 for detection by the vehicle 12. As depicted, the symbol or marking 78 may be a bar code. In certain embodiments, the symbol or marking may be a tick mark, shape, number, pattern, QR code, or any other kind of marking. The symbol or marking 78 may convey information (e.g., distance travelled, path information, speed, etc.) related to the path 44 to the vehicle 12 and/or the ride controller system.

Figure 6:
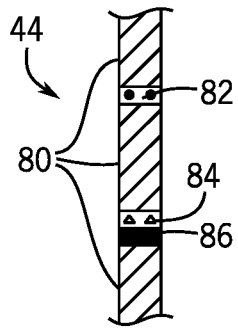
FIG. 6 illustrates an embodiment of a portion of a path having different characteristics, as taken within line 4-4 of FIGS. 2 and 3, in accordance with an aspect of the present disclosure.

FIG. 6 illustrates an embodiment of a portion of the path 44 having different characteristics over the progression of the path 44, as taken within line 4-4 of FIGS. 2 and 3. As depicted, most of the path 44 (e.g., regions 80) may be defined by a first characteristic for guiding the vehicle 12 along the path 44 (e.g., a diagonal line pattern as illustrated here). Other regions along the path 44 may include a different characteristics that may be associated with different control actions for the vehicle 12. For example, region 80 may project a diagonal line pattern, while region 82 may project a double adjacent circle pattern. In certain embodiments, the characteristics projected by region 82 may cause the vehicle 12 to spin or some other action (e.g., bounce, tilt, etc.). In some instances a show animation may be triggered by the vehicle controller based upon the observance of this characteristic. In certain embodiments, other regions (e.g., regions 84, 86) may provide other control actions related to the vehicle 12 (e.g., accelerate, decelerate, stop, etc.). One or more regions, similar to regions 84, 86, may be spaced apart or may contact each other. These regions 84, 86 may include projection characteristics different from region 80 and each other. Each region 80, 84, 86 may control certain characteristics of the vehicle 12. For example, each region 80, 84, and 86 be associated with a specific speed for the vehicle 12. For example, region 80 may be associated with the normal speed for the vehicle 12 along the path 44, while region 84 may be associated with a faster speed and region 86 may be associated with an even faster speed. Alternatively, region 84 may be associated with a slower speed and region 86 may be associated with an even slower speed. In certain embodiments, the change in projected characteristics by the regions may have gradations. For example, regions 80, 84, 86 may, in some embodiments, project different size magnitudes of a common shape or pattern, where the shape or pattern indicates a speed change (or other control type) and the magnitude indicates the magnitude of the speed change (or other control type). The path 44 may include a combination of regions for both acceleration and deceleration of the vehicle 12.

Figure 7:
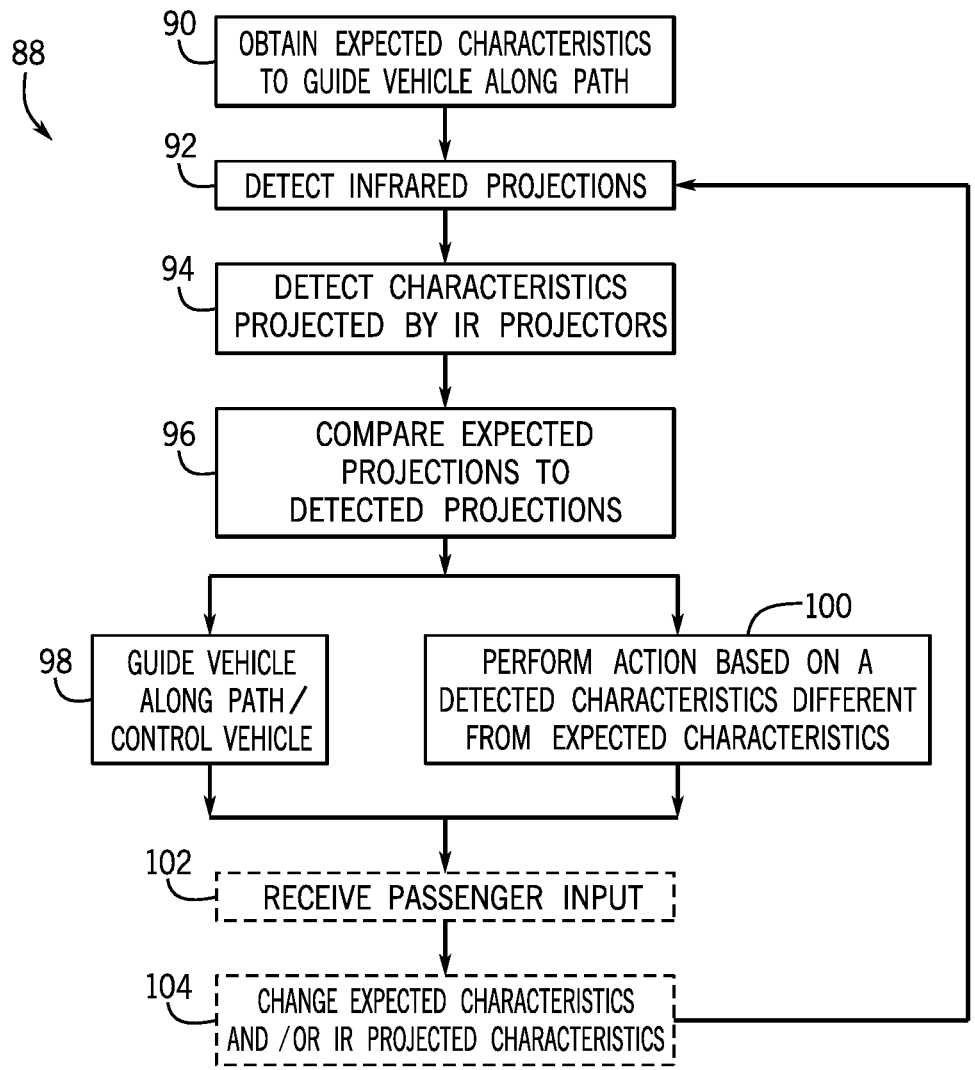
FIG. 7 is a flow chart of an embodiment of a method for guiding a vehicle in an amusement attraction utilizing the ride vehicle guidance system of FIG. 1, in accordance with an aspect of the present disclosure.

FIG. 7 is a flow chart of an embodiment of a method 88 for guiding the vehicle 12 in an amusement attraction utilizing the ride vehicle guidance system 10 of FIG. 1. One or more of the steps of the method 88 may be performed by the vehicle's controller 20 and/or the ride controller system 14. One or more of the steps of the method 88 may be performed simultaneously and/or in a different order from that depicted. The method 88 may include obtaining infrared projection characteristics to guide the vehicle 12 along the path 44 (block 90). In certain embodiments, more than one characteristic may be obtained by the vehicle 12. For example, a first portion of a ride may follow a first path with a first characteristic and a second portion of the ride may follow a different path with a different characteristic. Each vehicle 12 may be assigned a particular path (with a particular expected characteristic to find and follow). The assigned particular expected characteristic may be obtained from the respective memory of the vehicle's controller 20 and/or the ride controller system 14. In certain embodiments, prior to the ride beginning, the passenger may provide an input based on presented selections (e.g., related to theme, thrill level, etc.) and the input may be associated with one or more particular expected characteristics associated with one or more paths 44. In certain embodiments, when multiple vehicles are going to be utilized during the ride, each vehicle 12 may obtain a respective expected characteristic or set of expected characteristics to define their respective paths. In certain embodiments, with the multiple vehicles, prior to or during the ride, each vehicle 12 may obtain the expected characteristics and/or other information related to the other vehicles and their respective paths. Based upon the set of expected characteristics, some vehicles 12 may be instructed to ignore certain control characteristics, while others may be instructed to perform a control action when the same characteristics are detected. For example, one vehicle 12 might ignore a double adjacent circle pattern that typically instructs a vehicle 12 to spin around, while another vehicle 12 might spin around when such a characteristic is observed.

The method 88 also may include detecting, at the vehicle 12, infrared projections on a travel surface (block 92). The method 88 further may include detecting, via a sensor on the vehicle 12, characteristics projected by the infrared projections (block 94). For example, particular patterns of shapes, sizes, thicknesses, objects, etc. may be projected in the infrared projections.

The method 88 may include comparing the detected characteristics to the expected characteristics associated with the vehicle 12 (block 96). When the detected characteristics are the same as the expected characteristics, the method 88 may include guiding or moving the vehicle 12 along the path 44 and/or performing other control actions based upon the matched expected and detected characteristics (block 98). For example, control features of the vehicle 12 may indicate that when a particular characteristic is observed, the vehicle 12 should speed up, tilt, spin, trigger a show feature, etc. Thus, when such a characteristic is observed, the vehicle 12 (e.g., via a vehicle controller) may initiate the action.

When the detected characteristic is different from the expected characteristic, the method 88 may include the vehicle 12 performing a mitigating action. For example, in some instances, observing such a difference may indicate that the vehicle is on an improper path 44. The vehicle 12 may be stopped and/or may be directed back to the proper path (e.g., by activating an intermediate projection for the vehicle 12 to follow back to the proper path 44).

In certain embodiments, the method 88 may include receiving, during the ride, input from the passenger (block 102). The passenger may provide an input based on presented selections (e.g., related to theme, thrill level, etc.) and the input may be associated with one or more particular characteristics associated with one or more paths 44. In certain embodiments, the input may be associated with the same characteristic and the vehicle 12 keeps the same path. In certain embodiments, the passenger input may be associated with a different characteristic that changes the expected characteristic and, thus, the path 44 for guiding the vehicle 12 (block 104). In some embodiments, the input may change the projected characteristics along an already assigned path. For example, if a currently followed path is currently projecting dots, the projection can dynamically change to dashes.

Although the above embodiments relate to an amusement ride, the same techniques may be utilized in other applications. For example, the techniques may be applied to any automated guided vehicles (AGVs). The techniques may also be applied to moving elements in a ride/show environment that are not designed for human transportation. For example, an animated figure (e.g., a walking robot) may move on a path having light projections using the same projected light navigation systems as discussed above. Further, while the discussion has centered around infrared projections, other projections, such as visible light projections, could be used. The current discussion is not intended to limit embodiments to amusement rides or infrared projections.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for vehicle guidance, comprising:
a plurality of paths projected on a surface by using a plurality of light projection characteristics, wherein each path is defined by a light projection characteristic different than light projection characteristics defining other paths of the plurality of paths, wherein each path of the plurality of paths corresponds to a respective vehicle occupant experience of a plurality of available vehicle occupant experiences provided by an attraction, wherein each vehicle occupant experience of the plurality of available vehicle occupant experiences comprises one of a plurality of alternative experiences of the attraction, one of a plurality of thrill levels of the attraction, or both, wherein paths providing the plurality of alternative experiences of the attraction define respective locations and respective themes for vehicles to travel to and wherein paths providing a relatively higher thrill level comprise a relatively higher number of curved portions, sharp turns, spins, or any combination thereof, than paths providing a relatively lower thrill level; and a vehicle, wherein the vehicle comprises:
a sensor configured to detect a plurality of light projected characteristics of the plurality of paths projected on the surface; and
a controller configured to:
receive an indication of a desired vehicle occupant experience of the plurality of available vehicle occupant experiences associated with one of the respective themes, one of the plurality of thrill levels, or both;
determine a first light projection characteristic identifying a first path of the plurality of paths projected on the surface that provides the desired vehicle occupant experience;
identify, using the sensor, a path from the plurality of paths that comprises a first light projected characteristic that matches the first light projection characteristic as the first path; and
control the vehicle to move along the first path.

2. The system of claim 1, wherein the controller is further configured to:
identify, via the sensor, a second light projected characteristic of the first path;
control the vehicle along the first path in accordance with a control action associated with a second light projection characteristic that matches the second light projected characteristic; and
determine the first light projection characteristic, the second light projection characteristic, or both based at least in part on an input provided by a passenger of the vehicle.

3. The system of claim 2, wherein the controller is further configured to:
receive another input provided by the passenger during movement along the first path of the plurality of paths;
determine a different light projection characteristic based at least in part on the other input; and
change movement from the first path to an alternative path by using the determined different light projection characteristic.

4. The system of claim 2, wherein the second light projected characteristic of the first path changes at different locations along the first path to indicate different control actions for the controller to implement at the different locations.

5. The system of claim 4, wherein the different control actions comprise different movement speeds for the vehicle along the first path, and the controller is configured to control the vehicle in accordance with the different movement speeds at the different locations along the first path.

6. The system of claim 2, wherein the second light projection characteristic is associated with a spin control action; and
controlling the vehicle along the first path in accordance with the control action associated with the second light projection characteristic comprises causing the vehicle to spin based on detecting the second light projected characteristic.

7. The system of claim 1, further comprising a plurality of vehicles disposed on different paths of the plurality of paths, and respective controllers of the plurality of vehicles are configured to guide the plurality of vehicles on respective paths of the plurality of paths concurrently.

8. The system of claim 1, wherein the first light projected characteristic identifying the first path of the plurality of paths comprises a center portion of a path projected and the path projected comprises a first portion flanking the center portion, wherein the first portion comprises a different light projected characteristic.

9. The system of claim 8, wherein the controller is further configured to guide the vehicle to move toward the center portion of the path projected in response to detection of the different light projected characteristic.

10. A system for vehicle guidance, comprising:
a plurality of paths projected on a surface, wherein each path is defined and distinguished from other paths of the plurality of paths by light projected characteristics of corresponding light projections, wherein each path of the plurality of paths corresponds to a respective vehicle occupant experience of a plurality of available vehicle occupant experiences provided by an attraction, wherein each vehicle occupant experience of the plurality of available vehicle occupant experiences comprises one of a plurality of alternative experiences of the attraction, one of a plurality of thrill levels of the attraction, or both, wherein paths providing the plurality of alternative experiences of the attraction define respective locations and respective themes for vehicles to travel to and wherein paths providing a relatively higher thrill level comprise a relatively higher number of curved portions, sharp turns, spins, or any combination thereof, than paths providing a relatively lower thrill level; and
a plurality of vehicles, wherein each vehicle of the plurality of vehicles comprises:
an assigned light projection characteristic defining a path to follow that provides a desired vehicle occupant experience of the plurality of available vehicle occupant experiences provided by the attraction associated with one of the respective themes, one of the plurality of thrill levels, or both;
a sensor configured to detect the light projected characteristics of the plurality of paths projected on the surface; and
a controller configured to:
identify a respective path of the plurality of paths to follow based upon a match between the light projected characteristics of the respective path of the plurality of paths and the assigned light projection characteristic; and
control the vehicle to move along the respective path.

11. The system of claim 10, wherein each of the plurality of vehicles is configured to move along a different path, by assigning each of the plurality of vehicles a different light projection characteristic for each of the plurality of vehicles that are currently moving to follow.

12. The system of claim 10, wherein at least a subset of the plurality of vehicles is configured to move along the respective path concurrently, by assigning a common light projection characteristic to the subset of the plurality of vehicles.

13. The system of claim 10, wherein each of the corresponding light projections are not visible to passengers in the plurality of vehicles.

14. The system of claim 10, wherein the controller is further configured to change the respective path of the plurality of paths to follow based on an input during movement along the respective path of the plurality of paths, wherein the input is associated with a specific light projection characteristic to follow.

15. The system of claim 13, wherein the light projected characteristics of the respective path of the plurality of paths detected by the sensor comprise different light projected characteristics at different locations along the respective path of the plurality of paths.

16. The system of claim 15, wherein at least a subset of the different light projected characteristics represent different speeds for the vehicle along the respective path of the plurality of paths, and the controller is further configured to adjust a speed of the vehicle along the respective path of the plurality of paths based on detecting the at least the subset of the different light projected characteristics.

17. The system of claim 15, wherein at least a subset of the different light projected characteristics represent a control request to trigger an attraction feature outside of the vehicle along the respective path of the plurality of paths, and the controller is further configured to trigger the attraction feature along the respective path of the plurality of paths based on detecting the at least the subset of the different light projected characteristics.

18. A method for controlling a vehicle, comprising:

obtaining, at a controller of the vehicle, an assigned light projection characteristic defining a path to guide the vehicle along that provides a desired vehicle occupant experience of a plurality of available vehicle occupant experiences provided by an attraction associated with one of respective themes, one of a plurality of thrill levels, or both, wherein the path is among a plurality of paths projected on a surface, and each path among the plurality of paths is defined and differentiated from other paths of the plurality of paths by differing light projection characteristics, wherein each path of the plurality of paths corresponds to a respective vehicle occupant experience of the plurality of available vehicle occupant experiences provided by the attraction, wherein each vehicle occupant experience of the plurality of available vehicle occupant experiences comprises one of a plurality of alternative experiences of the attraction, one of the plurality of thrill levels of the attraction, or both, wherein paths providing the plurality of alternative experiences of the attraction define respective locations and the respective themes for vehicles to travel to and wherein paths providing a relatively higher thrill level comprise a relatively higher number of curved portions, sharp turns, spins, or any combination thereof, than paths providing a relatively lower thrill level;

identifying the path, by detecting, via a sensor on the vehicle, a light projected characteristic defining the path and, via the controller, a match of the light projected characteristic defining the path and the assigned light projection characteristic; and control, via the controller, the vehicle to move along the path.

19. The method of claim 18, wherein the assigned light projection characteristic comprises a particular bar code, a particular QR code, a particular shape, a particular pattern of objects, or any combination thereof.

20. The method of claim 18, further comprising:

halting movement of the vehicle when the assigned light projection characteristic cannot be detected by the sensor on the vehicle.

* * * * *